United States Patent [19]

Baile

[11] 4,434,127
[45] Feb. 28, 1984

[54] HEAT CURABLE POLYDIORGANOSILOXANE COMPOSITIONS HAVING ENHANCED RELEASE UPON CURE

[75] Inventor: Madhu Baile, Midland, Mich.

[73] Assignee: Dow Corning Corporation, Midland, Mich.

[21] Appl. No.: 448,140

[22] Filed: Dec. 9, 1982

[51] Int. Cl.$^3$ ............................................. B29C 25/00
[52] U.S. Cl. .............................. 264/236; 264/331.11; 264/347; 524/265; 524/266; 524/267; 524/493; 524/731
[58] Field of Search ............... 524/265, 266, 267, 493, 524/731; 264/331.11, 236, 347

[56] References Cited

U.S. PATENT DOCUMENTS 3,047,528 7/1962 Bluestein ............................. 260/37
3,549,744 12/1970 Compton ............................ 264/300

FOREIGN PATENT DOCUMENTS 811209 4/1969 Canada ................................ 400/73
1027580 3/1965 United Kingdom .

*Primary Examiner*—Melvyn I. Marquis
*Attorney, Agent, or Firm*—George A. Grindahl

[57] ABSTRACT

Organic peroxide curable polydiorganosiloxane compositions having improved release from metal molds upon curing are disclosed. In addition to the conventional high molecular weight polydiorganosiloxane gum, reinforcing filler, structure control additives, and curing agent, the improved compositions of this invention contain from 0.05 to 3 parts by weight of a polydiorganosiloxane fluid having methyl groups and carboxyfunctional groups as substituents.

16 Claims, No Drawings

HEAT CURABLE POLYDIORGANOSILOXANE COMPOSITIONS HAVING ENHANCED RELEASE UPON CURE

BACKGROUND OF THE INVENTION

Articles of silicone rubber, such as gaskets, O-rings, diaphragms, plugs, seals, flap valves, and a wide variety of other articles, are conventionally produced by, first, supplying a volume of organic peroxide containing polydiorganosiloxane composition to a metal mold, and second, applying heat to said composition. The article thus produced is said to be cured. By the term "cured" it is meant herein that said article is substantially stable dimensionally, and substantially insoluble in organic solvents which can dissolve most of the polydiorganosiloxane composition before it is cured. Examples of such solvents include toluene, benzene, xylene, hexane, heptane, and other solvents.

The economics of production of silicone rubber articles is strongly dependent upon the number of such articles that can be produced in a given amount of time. Consequently, easy release of the silicone rubber article from the metal mold is of great importance.

To provide easy release of silicone rubber articles from metal molds, a variety of methods have been developed. One such method is to coat the mold with a substance that will foster release, such as a detergent, mineral powder such as talc, or a halocarbon polymer. Unfortunately, substances such as these tend to be removed from the mold surface and become incorporated in the surface of the silicone rubber article. This removal from the mold surface of the releasing substance necessitates periodic reapplication of said substance to the mold surface, and incorporation of the releasing substance in the surface of the silicone rubber article tends to mar the surface of the article.

A better approach is to incorporate the releasing substance into the organic peroxide containing polydiorganosiloxane composition itself. U.S. Pat. No. 3,549,744 discloses a method of enhancing release from metal molds by incorporation of certain metal salts of carboxylic acids into the organic peroxide containing polydiorganosiloxane composition.

Nickel stearate has been by far the most successful of these salts, and is in wide use today. Unfortunately, nickel stearate tends to have a deleterious effect on compression set, which is a measure of the dimensional stability of a cured silicone rubber article. Additionally, nickel salts in general are known to be highly toxic.

Thus, there is a need for a release enhancing substance that can be added to organic peroxide containing polydiorganosiloxane compositions that results, upon cure, in silicone rubber having better compression set than is provided by nickel stearate containing compositions. Additionally, it is important to avoid handling toxic materials whenever possible.

Polydiorganosiloxanes having carboxyfunctional radicals are not unknown in the silicone rubber art. U.S. Pat. No. 3,047,528, discloses silicone rubber comprising a high molecular weight polydiorganosiloxane containing carboxyalkyl radicals, and having a viscosity greater than 0.1 m$^2$/second (100,000 centistokes), with conventional fillers and certain special curative agents.

Canadian Pat. No. 811,209, discloses low molecular weight organopolysiloxanes in which the end groups are selected from carboxyalkyl radicals, amidoalkyl radicals and ester radicals. Said low molecular weight organopolysiloxanes are disclosed as being useful structure control additives when incorporated into organic peroxide containing polydiorganosiloxane compositions.

United Kingdom Pat. No. 1,027,580, discloses a process for producing carboxyethyl substituted organopolysiloxanes, and said patent suggests that said organopolysiloxanes can be used as surfactants, emulsifiers, or they can be used for the modification of plastics, for instance of polyesters, siloxane elastomers, and organopolysiloxane oils.

None of the above patents disclose the present invention, which relates to the use of certain polydiorganosiloxane fluids having methyl radicals and carboxyfunctional radicals as substituents, to enhance release of silicone rubber articles from metal molds. None of the above patents disclose the compositions of the present invention.

SUMMARY OF THE INVENTION

The present invention relates, in one aspect, to improved organic peroxide containing polydiorganosiloxane compositions exhibiting enhanced release from metal molds upon cure.

In another aspect, the present invention relates to concentrates of polydiorganosiloxane fluid, having methyl radicals and carboxyfunctional radicals as substituents, which can be added to conventional organic peroxide containing compositions to provide release of the subsequently cured polydiorganosiloxane compositions. Cured organic peroxide containing compositions shall be referred to herein as silicone rubber.

In yet another aspect, the present invention relates to a method for improving the mold release characteristics of silicone rubber by the addition of said fluids to organic peroxide containing polydiorganosiloxane compositions prior to cure, and to silicone rubber articles produced by said method.

It is an object of the present invention to provide novel compositions having good release from metal molds. It is a further object to provide easily released molded silicone rubber articles having improved compression set. It is another object to provide good release of molded silicone rubber articles while avoiding the health hazards associated with nickel salts.

These objects, and other objects which will be apparent to those skilled in the art upon consideration of the present specification and claims, are realized by the compositions and method of the present invention, wherein certain polydiorganosiloxane fluids, having methyl radicals and carboxyfunctional radicals as substituents, are incorporated into organic peroxide containing polydiorganosiloxane compsitions.

DETAILED DESCRIPTION OF THE INVENTION

The present invention relates to a composition comprising (A) 100 parts by weight of an organic peroxide containing polydiorganosiloxane composition, and, (B) from 0.05 to 3.0 parts by weight of a polydiorganosiloxane fluid having the formula Me$_3$SiO(MeQSiO)$_x$(Me$_2$SiO)$_y$SiMe$_3$, wherein Me represents the methyl radical, Q represents a carboxyfunctional radical bonded to the silicon atom by an Si—C bond, x has an average value of from 1% to 5% of the value of y, and the average value of the sum of the values of x and y is from about 100 to about 800.

Organic peroxide containing polydiorganosiloxane compositions, component (A) of the compositions of the present invention, are quite well known, and need only be generally described herein; those skilled in the art will be familiar with such compositions and their manufacture. Generally, said organic peroxide containing compositions comprise: one or more high molecular weight polydiorganosiloxane; one or more filler; one or more curing agent; one or more structure control additives; and a variety of non-essential components.

By organic peroxide containing polydiorganosiloxane composition, it is meant herein a polydiorganosiloxane composition that contains free radical generating curing agents as hereinbelow described and can be cured by application of heat.

The high molecular weight polydiorganosiloxane has the general formula $R_3SiO(R_2SiO)_zSiR_3$, wherein each R is selected from the group consisting of: monovalent hydrocarbon radicals having from 1 to 6 carbon atoms, such as methyl, ethyl, propyl, butyl, hexyl, cyclohexyl, phenyl, vinyl, and allyl radicals; hydrogen radicals; and 3,3,3-trifluoropropyl radicals. Most commonly, and preferably in the compositions of the present invention, at least 50% of the R radicals are methyl radicals. While the preferred end groups for the high molecular weight polydiorganosiloxane are R radicals as hereinabove described, one hydroxyl group at each end is not thought to adversely affect the compositions of the present invention. The value of z is selected such that the viscosity of the high molecular weight polydiorganosiloxane is in excess of 0.1 m$^2$/second at 25° C., and more preferably in excess of 1 m$^2$/second at 25° C. Representative appropriate values for z when 98% or more of the R radicals are methyl radicals, are 2000 and more. High molecular weight polydiorganosiloxanes such as those in which the viscosity is 1 m$^2$/second or more at 25° C. are referred to herein as gums. The high molecular weight polydiorganosiloxane can contain small amounts of chain branching, such as those amounts encountered in its commercial manufacture.

The reinforcing filler in the organic peroxide containing polydiorganosiloxane compositions used in the present invention is typically an amorphous silica having a surface area of at least 50 m$^2$/g, and less than about 500 m$^2$/g. Useful types of silica include fume silica, precipitated silica, and silica gel. The filler provides reinforcement in a cured silicone rubber. The use of silica in reinforcing silicone rubber is well known, and need not be further detailed herein.

The structure control additives of the organic peroxide containing polydiorganosiloxane composition are added to inhibit the phenomenon commonly called crepe-hardening, which can render a composition unworkable. Typically, structure control additives are low molecular weight polydiorganosiloxane fluids having polar substituents. Structure control additives are well known in the art and need not be further detailed herein.

Curing agents contemplated for use in conjunction with the present invention are those agents that decompose with elevated temperature to generate free radicals. Examples of such free radical generators are azo compounds, such as azo-bis(isobutyronitrile), and organic peroxides, such as benzoyl peroxide, t-butylperbenzoate, dicumyl peroxide, 2,4-dichlorobenzoyl peroxide, di-(t-butyl peroxide), para-dichlorobenzoyl peroxide, 2,5-bis-(t-butyl-peroxy)-2,5-dimethylhexane, butyl-triethylmethyl peroxide, butyl-triptyl peroxide, monochlorobenzoyl peroxide, and alkylperoxyalkyl carbonates such as t-butylperoxyisopropylcarbonate.

High molecular weight polydiorganosiloxanes wherein from about 0.05% to about 1% of the R radicals are unsaturated monovalent hydrocarbon radicals, such as vinyl or allyl radicals, are generally preferred for use in conjunction with free radical generator curing agents.

Non-essential additives that are common in the art can be present in the curable polydiorganosiloxane compositions useful in the present invention. Examples of such additives include, but are by no means limited to: pigments; heat stability additives; additives to increase or decrease electrical resistivity; mildewcides; and extending fillers.

The polydiorganosiloxane fluid having methyl radicals and carboxyfunctional radicals as substituents, component (B) of the compositions of the present invention, has the formula $Me_3Si(MeQSiO)_x(Me_2SiO)_ySiMe_3$, wherein Me represents the methyl radical, and Q represents a carboxyfunctional radical.

The carboxyfunctional radical is a radical containing the —COOH group, and is bonded to the silicon atom via an Si—C bond. The —COOH group is attached to the silicon atom via a divalent radical, which can contain 2 to 10 carbon atoms, or said divalent radical can contain 2 to 10 carbon atoms and one sulfur atom present as a thioether linkage, or said divalent radical can contain 2 to 10 carbon atoms and one oxygen atom present at an ether linkage. Illustrative suitable Q radicals are:

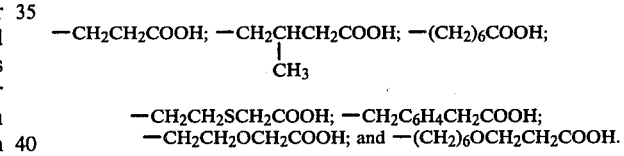

Other suitable Q radicals will be apparent to those skilled in the art.

The average value of x in the above formula for component (B) is from 1% to about 5% of the value of y in said formula, and the average value of the sum of the values of x plus y is from about 100 to about 800. The resulting viscosity of component (B) is therefore, from approximately $2.0\times10^{-4}$ m$^2$/second at 25° C. to approximately $1.0\times10^{-2}$ m$^2$/second at 25° C. Small amounts, such as 5% or 10% of the Me radicals can be R radicals as hereinabove set forth without adversely affecting the mold release enhancing characteristics of the polydiorganosiloxane fluids useful in the present invention.

Polydiorganosiloxane fluids having methyl radicals and carboxyfunctional radicals as substituents are commercially available. Alternatively, said fluids can be synthesized by the basic equilibration of a polydimethylsiloxane fluid of an appropriate molecular weight, i.e. a polydimethylsiloxane having between about 95 and about 760 (Me$_2$SiO) units, and an appropriate amount of a silane bearing two hydrolyzable groups, a carboxyfunctional radical as hereinabove described, and an R radical, preferably a methyl radical. Examples of suitable hydrolyzable groups include halogen atoms, such as F, Cl, Br or I; alkoxy groups, such as methoxy, ethoxy, propoxy; aryloxy groups, such as phenoxy groups;

acyl groups, such as acetyl, propionyl, or benzoyl; amino groups; and ketoximo groups. Another suitable method of synthesizing polydiorganosiloxane fluids having methyl radicals and carboxyfunctional radicals as substituents is disclosed in U.S. Pat. No. 2,723,987, hereby incorporated herein by reference.

The improved organic peroxide containing polydiorganosiloxane compositions of the present invention are produced by mixing component (A) and component (B) by suitable mixing means for a span of time sufficient to produce a uniform mass.

Mixing means suitable for mixing together the two components are well known. Said means are characterized by having the ability to impose high shear rate mixing upon viscous masses. Exemplary of such mixing means are two roll rubber mills and bread dough type mixers such as Banbury ® mixers.

While specific order of addition of the components, and selection of mixing means are not narrowly critical, certain procedures are preferred as a practical matter.

In a first procedure, the constituents of organic peroxide curable composition (A), plus component (B), are all added to a bread dough type mixer and mixed for a period of time sufficient to produce a uniform mass.

In a preferred procedure, the high molecular weight polydiorganosiloxane, filler, and structure control additive constituents of component (A), are mixed together in a bread dough type mixer and simultaneously heated to a temperature of from 50° C. to about 150° C. for a period of time from about 5 minutes to about 3 hours. The resulting mass is cooled to approximately room temperature, the curing agent constituent of component (A) is added to the cooled mass with continued mixing. Component (B) is then added, and sufficient additional mixing is performed to render the product uniform.

In a another preferred procedure, component (A), previously provided by either processing the constituents in the conventional manner, or by purchasing component (A), is milled upon a two roll mill provided with cooling. When component (A) has become a uniform sheet, the appropriate amount of component (B) is added and the resulting mass is milled for a length of time sufficient to render the resulting mixture uniform.

In a most preferred method, component (B) is provided in a concentrate, which is a mixture of component (B), high molecular weight polydiorganosiloxane, and, optionally, a reinforcing filler.

Thus the present invention further relates to a concentrate comprising (I) from about 1% by weight to about 99% by weight, based on the total weight of the concentrate, of a polydiorganosiloxane gum;

(II) from about 0% by weight to about 40% by weight, based on the total weight of the concentrate, of amorphous silica;

(III) from about 1% by weight to about 99% by weight, based on the total weight of the concentrate of a polydiorganosiloxane fluid having the formula $Me_3SiO(MeQSiO)_x(Me_2SiO)_ySiMe_3$, wherein Me represents the methyl radical, Q represents a carboxyfunctional radical bonded to the silicon atom by an Si—C bond, x has an average value of from 1% to 5% of the value of y, and the average value of the sum of the values of x and y is from about 100 to about 800.

More preferably, said concentrate comprises: from about 5% by weight to about 80% by weight, based on the total weight of the concentrate, of component (I); from about 0% by weight to about 30% by weight, based on the total weight of the concentrate, of component (II); and from about 10% by weight, to about 80%, by weight, based on the weight of the concentrate, of component (II).

Most preferably, said concentrate comprises: from about 30% by weight to about 60% by weight, based on the total weight of the concentrate, of component (I); from about 10% by weight to about 30% by weight, based on the total weight of the concentrate, of component (II); and from about 20% by weight to about 60% by weight, based on the total weight of the concentrate, of component (III).

In addition to components (I), (II), and (III) as hereinabove delineated, the concentrate can contain up to about 50% non-essential components as set forth in the description of the organic peroxide curable polydiorganosiloxane composition.

Components (I), (II) and (III) are mixed together by suitable mixing means, such as the bread dough type mixer or two roll mill as hereinabove described.

The concentrate of the present invention can be easily mixed with a previously provided heat curable polydiorganosiloxane composition, component (A), using suitable mixing means for an amount of time sufficient to produce a uniform mass.

The compositions of the present invention, comprising components (A) and (B) as hereinabove described and mixed together as hereinabove described, are suitable for the manufacture of silicone rubber articles having enhanced release from metal molds.

The present invention further relates to a method of improving the release of organic peroxide cured silicone rubber from metal molds, said method comprising, (i) mixing with 100 parts by weight of an organic peroxide containing polydiorganosiloxane composition from 0.05 parts by weight to 3.0 parts by weight of a polydiorganosiloxane fluid having the formula $Me_3SiO(MeQSiO)_x(MeSiO)_ySiMe_3$, wherein Me represents the methyl radical, Q represents a carboxyfunctional radical bonded to the silicon atom by an Si—C bond, x has an average value of from 1% to 5% of the value of y, and the average value of the sum of the values of x and y is from about 100 to about 800, (ii) placing the mixture from (i) in a metal mold, (iii) subjecting the mixture in the metal mold to heat for an amount of time sufficient to cure said molded mixture, and, (iv) removing the cured silicone rubber from the mold, Manufacture of silicone rubber articles is accomplished in a molding operation. Molding operations in the silicone rubber art are accomplished in three general steps: first, an appropriate volume of organic peroxide containing polydiorganosiloxane composition is placed in a mold; second, the composition is heated to a sufficient temperature for a sufficient period of time to cure said composition; and third, the silicone rubber article thus produced is removed from the mold. The term placing, as used herein, is meant to encompass methods of providing the composition to the mold, and methods of forcing the composition into conformance with the internal dimensions of the mold.

Apparatus for performing these steps is well known and widely available. For example, in an injection molding operation, a suitable volume of organic peroxide containing composition is forcibly injected into a heated mold by the action of a screw, through an opening in the mold. The composition is heated through contact with the mold, and when cure has been accomplished, the mold is mechanically opened and the silicone rubber article thus produced is removed from the open mold.

In a transfer molding operation, a plug of organic peroxide containing composition is provided to a chamber, whence it is injected into a heated mold by a ram. The procedure after said injection is basically that described above for injection molding.

In a press molding operation, commonly utilized to produce sheets and other flat articles, a suitable volume of organic peroxide containing composition is placed in a chase, between two coplanar platens. The platens are then driven together, and sufficient pressure is exerted that the composition flows to fill the volume defined by the chase and the platens. The composition is then heated to a sufficient temperature for a sufficient span of time to cure the composition, the platens are withdrawn, and the resulting silicone rubber article is removed.

The above examples of molding operations are merely illustrative, and are not limiting. Those skilled in the art will be aware of other suitable molding operations, and variations practicable upon the operations hereinabove described.

The compositions of the present invention are easily removed in molding operations.

The compositions and method of the present invention not only provide easy release for silicone rubber articles produced in molding operations and eliminate the need to handle toxicologically questionable components, but, surprisingly, furnish silicone rubber articles having superior compression set.

The following examples are appended to further illustrate the present invention, and are not intended to limit the scope of said invention. All parts and percentages reported herein are by weight unless otherwise indicated. Viscosity values reported herein were measured in centistokes at 25° C., and converted to m²/second by multiplying the viscosity in centistokes by $1.000 \times 10^{-6}$ m²/second/centistoke, and rounding the result of said multiplication to three significant figures. Me in the following examples represents the methyl radical.

Testing—The following test procedures were used to evaluate the Examples and comparisons reported herein.

Release—Release values reported herein were determined by molding and curing the composition to be tested between two steel sheets. Cure conditions are reported in the Examples. Manual separation of the cured rubber from the steel was attempted and a number from 0 to 10 was assigned according to the relative ease of separation.

A value of 10 indicates that the rubber separated from the steel under its own weight; a value of 7 indicates that moderate force was necessary to effect separation; a value of 5 indicate that substantial force was necessary; and a value of 0 indicates that the rubber was strongly bonded to the steel.

Compression Set—Compression set values were determined herein by Dow Corning Test Method 0085, which is similar to ASTM D 395, method B. In this test, a disk or button of rubber was compressed to 75% of its original thickness with a constant deflection clamp, and was held, at that compression, and at a temperature of 150° C., for 22 hours. At the end of the 22 hours, the clamp was removed and the disk was allowed to come to room temperature. The values of thickness of the disk before and after the compression cycle were then compared, and the thickness not recovered was expressed as a percentage. It will be recognized that lower values of compression set are indicative of silicone rubber having greater utility in applications involving compression, such as gaskets, O-rings and the like.

Materials—The following materials were used in the Examples:

Formulation A

Mixture of polydimethylsiloxane gum having approximately 0.1% vinylsiloxy units, fume silica, manganese octoate, and a mixture of low molecular weight hydroxyl endblocked poly(methylvinyl)siloxane and hexamethyldisilazane: 100 parts
grey pigment: 0.76 parts
magnesium oxide: 7.56 parts
mixture of 100 parts cerric hydrate and 100 parts of polydimethylsiloxane gum: 1 part
2,5-bis(t-butylperoxy)-2,5-diemthylhexane: 1 part

Formulation B

Polydimethylsiloxane gum having approximately 0.1% vinylsiloxy units: 100 parts
Mixture of low molecular weight hydroxyl endblocked polydimethylsiloxane and low molecular weight hydroxyl endblocked poly(methylvinyl)siloxane: 7.5 parts
precipitated silica: 49 parts
ammonium carbonate: 0.04 parts
2,4-dichlorobenzoyl peroxide: 1.0 parts

Formulation C

Polydimethylsiloxane gum having approximately 0.1% vinylsiloxy units: 100 parts
Mixture of low molecular weight hydroxyl endblocked polydimethylsiloxane and low molecular weight hydroxy endblocked poly(methylvinyl)siloxane: 8.5 parts
precipitated silica: 45 parts
ammonium carbonate: 0.05 parts
2,4-dichlorobenzoyl peroxide: 1.0 parts

Formulation D

Same as Formulation B, except that 1.0 parts of 2,5-bis(t-butylperoxy)-2,5-dimethylhexane were used in place of the 2,4-dichlorobenzoyl peroxide.

Extending Filler—Min-u-sil ®, ground quartz having an average particle size of 5 μm; this extending filler is a product of the Pennsylvania Glass Sand Corp., New York, N.Y.

EXAMPLE 1

A concentrate of the present invention, consisting of 50 parts of a polydiorganosiloxane fluid having the formula

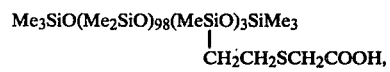

said fluid having a viscosity of $2.5 \times 10^{-4}$ m²/second at 25° C., and 50 parts of a polydimethylsiloxane gum containing approximately 0.1% vinylsiloxy units, was prepared by mixing these two components together on a two roll mill for a period of time sufficient to produce a uniform mixture. One hundred parts of Formulation A and 0.21 parts of the above-prepared concentrate were then milled together until uniform. The resulting heat curable composition of the present invention was compression molded between steel plates, and cured, under compression, for 10 minutes at 171° C.

The resulting cured silicone rubber sheet was found to have excellent release from the steel plates, rated at 10. The resulting cured silicone rubber sheet was found to have a compression set value of 14.4%. See Table 1.

Comparisons were generated by repeating the above procedure with the metal carboxylates of the prior art used in place of the polydiorganosiloxane fluid having methyl radicals and carboxyfunctional radicals. See Table 1.

TABLE 1

| Release Enhancing Substance | Release Value | Compression Set |
|---|---|---|
| Example 1 | 10 | 14.4% |
| Nickel stearate | 9 | 19.8% |
| Calcium stearate | 2 | 17.9% |
| Zinc stearate | 5 | 20.5% |

EXAMPLE 2

One-half part of the concentrate of Example 1 was mixed with 100 parts of Formulation B to provide a composition of the present invention. This composition was compression molded as described in Example 1 and cured for 5 minutes at 116° C. The cured rubber was found to have a release value of 7.

A comparison experiment duplicated the above experiment with a 50% nickel stearate, 50% polydimethylsiloxane gum concentrate of the prior art. The release value for this comparison was also found to be 7. See Table 2.

EXAMPLE 3

The procedure of Example 2 was repeated using 1.0 parts of the concentrate of Example 1 mixed with 100 parts of Formulation B, and 100 parts of Min-u-sil ®. The release value was determined to be 9. See Table 2.

A comparison experiment duplicating the above conditions but substituting 1.0 parts of a 50% nickel stearate—50% polydiemthylsiloxane gum for the concentrate of Example 1, also had a release value of 9. See Table 2.

EXAMPLE 4

The procedure of Example 2, was repeated with 2.0 parts of the concentrate of Example 1. The release value was found to be 10. See Table 2.

EXAMPLE 5

The procedure of Example 2 was repeated with 100 parts of Formulation C, 0.5 parts of the concentrate of Example 1 and 100 parts of Min-u-sil ®. The release value was found to be 8.

A comparison using an equivalent amount of nickel stearate also had a release value of 8. See Table 2.

EXAMPLE 6

The procedure of Example 2 was followed using 1.0 parts of a polydiorganosiloxane fluid having the formula

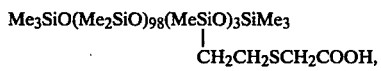

Me$_3$SiO(Me$_2$SiO)$_{98}$(MeSiO)$_3$SiMe$_3$
|
CH$_2$CH$_2$SCH$_2$COOH, 100 parts of Formulation D, and a cure time of 10 minutes at a temperature of 171° C. The release value of the cured silicone rubber was found to be 8. See Table 2.

EXAMPLE 7

To the formulation of Example 6 was added 100 parts of Min-u-sil ®. The release value upon cure was found to be 10. See Table 2.

TABLE 2

| Example | Formulation | Min-u-sil ®, parts | Release Agent, parts | Release Value |
|---|---|---|---|---|
| 2 | B | — | 0.5, concentrate[1] | 7 |
| comparison | B | — | 0.5, nickel stearate[2] | 7 |
| 3 | B | 100 | 1.0, concentrate[1] | 9 |
| comparison | B | 100 | 1.0, nickel stearate | 9 |
| 4 | B | 100 | 2.0, concentrate[1] | 10 |
| 5 | C | 100 | 0.5, concentrate[1] | 8 |
| comparison | C | 100 | 0.5, nickel stearate | 8 |
| 6 | D | — | 1.0, fluid[3] | 8 |
| 7 | D | 100 | 1.0, fluid[3] | 10 |

[1]The 50% concentrate of Example 1
[2]A 50% nickel stearate, 50% polydimethylsiloxane gum composition
[3]Me$_3$SiO(Me$_2$SiO)$_{98}$(MeSiO)$_3$SiMe$_3$
  |
  CH$_2$CH$_2$SCH$_2$COOH The above Examples illustrate the following points: the compositions of the present invention provide for release of subsequently cured silicone rubber that is as good or better than the compositions of the prior art; the compositions of the present invention provide cured silicone rubber of improved compression set; the concentrates of the present invention can be used with a variety of formulations. In addition, the compositions of the present invention are believed to be less toxic than nickel stearate which is the most effective of the prior art metal carboxylate release agents.

That which is claimed is:

1. A composition comprising
   (A) 100 parts by weight of an organic peroxide containing polydiorganosiloxane composition, and
   (B) from 0.05 to 3.0 parts by weight of a polydiorganosiloxane fluid having the formula Me$_3$SiO(MeQSiO)$_x$(Me$_2$SiO)$_y$SiMe$_3$, wherein Me represents the methyl radical, Q represents a carboxyfunctional radical bonded to the silicon atom by an Si—C bond, x has an average value of from 1% to 5% of the value of y, and the average value of the sum of the values of x and y is from about 100 to about 800.

2. The composition of claim 1 wherein Q is the CH$_2$CH$_2$SCH$_2$COOH radical.

3. The composition of claim 1 wherein Q is the CH$_2$CH$_2$OCH$_2$COOH radical.

4. A concentrate composition comprising
   (I) from about 1% by weight to about 99% by weight, based on the total weight of the concentrate, of a polydiorganosiloxane gum;
   (II) from about 0% by weight to about 40% by weight, based on the total weight of the concentrate, of reinforcing filler;
   (III) from about 1% by weight to about 99% by weight, based on the total weight of the concentrate of a polydiorganosiloxane fluid having the formula Me$_3$SiO(MeQSiO)$_x$(Me$_2$SiO)$_y$SiMe$_3$, wherein Me represents the methyl radical, Q represents a carboxyfunctional radical bonded to the silicon atom by an Si—C bond, x has an average value of from 1% to 5% of the value of y, and the average value of the sum of the values of x and y is from about 100 to about 800.

5. The concentrate of claim 4 comprising from about 5% by weight to about 80% by weight, based on the total weight of the concentrate, of component (I); from about 0% to about 30% by weight, based on the total weight of the concentrate, of component (II); and from about 10% by weight to about 80% by weight, based on the total weight of the composition, of component (III).

6. The concentrate of claim 5 comprising from about 40% by weight to about 60% by weight, based on the total weight of the concentrate, of component (I); from about 10% by weight to about 20% by weight, based on the total weight of the concentrate, of component (II); and from about 20% by weight to about 60% by weight, based on the total weight of the concentrate, of component (III).

7. The concentrate of claim 4 wherein Q is the $CH_2CH_2SCH_2COOH$ radical.

8. The concentrate of claim 5 wherein Q is the $CH_2CH_2SCH_2COOH$ radical.

9. The concentrate of claim 6 wherein Q is the $CH_2CH_2SCH_2COOH$ radical.

10. The concentrate of claim 4 wherein Q is the $CH_2CH_2OCH_2COOH$ radical.

11. The concentrate of claim 5 wherein Q is the $CH_2CH_2OCH_2COOH$ radical.

12. The concentrate of claim 6 wherein Q is the $CH_2CH_2OCH_2COOH$ radical.

13. A method of improving the release of organic peroxide cured silicone rubber from metal molds, said method comprising,
(i) mixing with 100 parts by weight of an organic peroxide containing polydiorganosiloxane composition from 0.05 parts by weight to 0.3 parts by weight of a polydiorganosiloxane fluid having the formula $Me_3SiO(MeQSiO)_x(MeSiO)_ySiMe_3$, wherein Me represents the methyl radical, Q represents a carboxyfunctional radical bonded to the silicon atom by an Si—C bond, x has an average value of from 1% to 5% of the value of y, and the average value of the sum of the values of x and y is from about 100 to about 800;
(ii) placing the mixture from (i) in a metal mold,
(iii) subjecting the mixture in the metal mold to heat for an amount of time sufficient to cure said molded mixture, and,
(iv) removing the cured silicone rubber from the mold.

14. A method of improving the release of organic peroxide cured silicone rubber from metal molds, said method comprising,
(i) mixing with 100 parts of an organic peroxide curable polydiorganosiloxane composition from about 0.05 parts by weight to about 100 parts by weight of the concentrate of claim 4,
(ii) placing the mixture from (i) in a metal mold,
(iii) subjecting the mixture in the metal mold to heat for an amount of time sufficient to cure said mixture, and,
(iv) removing the cured silicone rubber from the mold.

15. A silicone rubber article produced by the method of claim 13.

16. A silicone rubber article produced by the method of claim 14.

* * * * *

UNITED STATES PATENT AND TRADEMARK OFFICE
CERTIFICATE OF CORRECTION

PATENT NO. : 4,434,127
DATED : February 28, 1984
INVENTOR(S) : Madhu Baile

It is certified that error appears in the above-identified patent and that said Letters Patent is hereby corrected as shown below:

Column 12, line 5; delete "$Me_3SiO(MeQSiO)_x(MeSiO)_ySiMe_3$"
and substitute "$Me_3SiO(MeQSiO)_x(Me_2SiO)_ySiMe_3$"

Column 12, line 6; delete "methy" and substitute "methyl"

Signed and Sealed this

Twenty-ninth Day of May 1984

[SEAL]

Attest:

Attesting Officer

GERALD J. MOSSINGHOFF

Commissioner of Patents and Trademarks